US012322418B1

(12) United States Patent
Liu et al.

(10) Patent No.: US 12,322,418 B1
(45) Date of Patent: Jun. 3, 2025

(54) VINYL RECORD PLAYER AUTOMATIC STOP AND LIFT TONEARM STRUCTURE

(71) Applicant: HANPIN ELECTRON CO., LTD., Tainan (TW)

(72) Inventors: Shen-Keng Liu, Tainan (TW); Hsi-Ping Wang, Tainan (TW); Chang-Hsiou Lu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 0 days.

(21) Appl. No.: 18/652,966

(22) Filed: May 2, 2024

(51) Int. Cl.
  *G11B 3/00* (2006.01)
  *G11B 3/085* (2006.01)
(52) U.S. Cl.
  CPC .................. *G11B 3/085* (2013.01)
(58) Field of Classification Search
  CPC ........... G11B 3/0955; G11B 3/38; G11B 3/00;
    G11B 19/14; G11B 3/60; G11B 3/46;
    G11B 17/00; G11B 21/006; G11B 17/04;
    G11B 3/06; G11B 3/08

USPC ................ 369/184, 229, 280, 283
See application file for complete search history.

(56) References Cited

U.S. PATENT DOCUMENTS 10,290,316 B1 * 5/2019 Liu .................. G11B 3/085

* cited by examiner

*Primary Examiner* — Nabil Z Hindi
(74) *Attorney, Agent, or Firm* — Rosenberg, Klein & Lee (57) ABSTRACT

The invention relates to a vinyl record player automatic stop and lift tonearm structure. The vinyl record player includes a turntable for placing a record and a base for installing a tonearm. The base includes an inner shaft portion arranged thereon. The tonearm includes a rotating shaft portion correspondingly assembled on the inner shaft portion. The base includes a sensor provided on the inner shaft portion. The tonearm includes a magnetic element arranged on a circumference of the rotating shaft portion and corresponding with the sensor. The base includes a bracket assembled thereon for installing the tonearm. The bracket has a central shaft connected to an electromagnetic unit and an elastic member. The electromagnetic unit is electrically controlled to drive the bracket down to link the tonearm, and the electromagnetic unit to release the bracket and use the compression force of the elastic member to lift the bracket.

7 Claims, 9 Drawing Sheets

VINYL RECORD PLAYER AUTOMATIC STOP AND LIFT TONEARM STRUCTURE

BACKGROUND OF THE PRESENT INVENTION

Field of Invention

The invention relates to a vinyl record player automatic stop and lift tonearm structure, in particular to, when the tonearm enters the end point of the record music, the turntable stops operating, the tonearm is raised, and the bracket lifts the tonearm, which is an application of the invention.

Description of Related Arts

Vinyl turntables currently sold on the market all use a stylus to read the vinyl record and play music. After the music play is finished, the stylus is still in constant contact and friction with the turntable and even accidentally slides out of the track and rubs against the label in the center of the record, which shortens the life of the stylus and causes damage to the stylus. A high-quality stylus can cost up to thousands of dollars, and if it is operated as mentioned above, the cost of maintenance will be relatively high. Therefore, it is necessary to detect the position of the tonearm to determine whether the music playback has ended in order to stop and lift the tonearm to stop the stylus reading action to avoid the above situation.

On the model with lifting and lowering and stopping the tonearm on the market, two ways will be generally distinguished. One is to use a photo interrupter to determine that the tonearm has reached the end of the music and automatically return the tonearm to the bracket. This method has fixed installation for the photo interrupter, which may produce false actions and early or delayed actions due to external light source noise and deviation in light shielding angle. The up and down movement process of the bracket adopts the belt type, which is prone to slippage and is affected by the tightness of the belt due to the ambient temperature, thereby affecting the operating time of the bracket. The other method is to analyze the signal read by the stylus after the music finishes playing on the record to stop the rotation of the turntable and return the tonearm to the bracket. However, this method will be deviated due to the cleanliness or the old and new conditions of the record. Once there is a small problem with some tracks of the record, it will be misjudged that the music playback is over, and the tonearm will return to the bracket and the turntable will stop.

In view of this, the inventor adheres to many years of rich experience in design, development and practical production of the related industry and is actively engaged in research and development, and provides a vinyl record player automatic stop and lift tonearm structure, which can use the detection of the tonearm position to accurately determine the end of music playback, thereby stopping and lifting the tonearm to prevent the above-mentioned situations, in order to achieve better practical value.

SUMMARY OF THE PRESENT INVENTION

The main purpose of the present invention is to provide a vinyl record player automatic stop and lift tonearm structure, in particular to, a technology that when the tonearm reaches the end point of the record music, the turntable stops operating, the tonearm is raised, and the bracket lifts the tonearm.

The main purpose and effect of the vinyl record player automatic stop and lift tonearm structure of the present invention are achieved by the following specific technical means:

wherein the vinyl record player includes a turntable provided thereon for placing a record and a base arranged thereon for installing a tonearm, wherein the base includes an inner shaft portion arranged thereon, wherein the tonearm includes a rotating shaft portion correspondingly assembled on the inner shaft portion, wherein the base includes a sensor provided on the inner shaft portion, wherein the tonearm includes a magnetic element arranged on a circumference of the rotating shaft portion and corresponding with the sensor, wherein the base includes a bracket assembled thereon for installing the tonearm, wherein the bracket has a central shaft connected to an electromagnetic unit and an elastic member. In this way, the electromagnetic unit is electrically controlled to drive the bracket down to link the tonearm, so that when the stylus contacts the record and moves with the rotation of the record, the sensor senses the changes in the magnetic field lines of the magnetic element to accurately determine the rotation and movement angle of the tonearm. When the tonearm moves to the end of music playback, the turntable can be controlled to automatically stop, allowing the electromagnetic unit to release the bracket and use the compression force of the elastic member to lift the bracket.

In a preferred embodiment, the sensor is implemented as a Hall element.

In a preferred embodiment, the magnetic element is implemented as a bipolar neodymium iron boron magnet.

In a preferred embodiment, the electromagnetic unit includes a radially magnetized magnetic ring, a coil embedded in the magnetic ring, and a high-permeability metal base for mounting the coil.

In a preferred embodiment, the elastic member is implemented as a spring.

DETAILED DESCRIPTION OF THE PREFERRED EMBODIMENT

First, the actual application technology and means of the present invention, as shown in FIGS. 1 to 4, which are exploded, perspective and top views of the present invention. A vinyl record player (1) includes a turntable (2) provided thereon for placing a record and a tonearm (3)

provided thereon, wherein the rotation of the turntable (2) drives the record to rotate, causing the stylus of the tonearm (3) to move along with the track of the record to play music. The vinyl record player (1) includes a base (4) arranged thereon for installing the tonearm (3), wherein the base (4) includes an inner shaft portion (41) arranged thereon, wherein the tonearm (3) includes a rotating shaft portion (31) and is correspondingly assembled on the inner shaft portion (41), so that the tonearm (3) is capable of rotating at an angle relative to the base (4), wherein the tonearm (3) includes a magnetic element (32) located on the rotating shaft portion (31) that extends an appropriate length along the circumference thereof. The base (4) includes a sensor (42) provided on the inner shaft portion (41) corresponding with the magnetic element (32), wherein the sensor (42) is connected with a control unit (5) [MCU]. The base (4) includes a bracket (43) assembled thereon, and the bracket (43) has a central shaft (431) arranged thereon. The base (4) includes an elastic member (44) sleeved on the central shaft (431), and an electromagnetic unit (45) provided on the shaft to control the lifting and lowering of the bracket (43), wherein the electromagnetic unit (45) is connected with the control unit (5).

Referring to FIGS. 1-9, the present invention is mainly divided into two parts: tonearm angle detection and tonearm lifting and lowering. The description is as follows:

(1) Tonearm angle detection part-referring to FIGS. 4 to 5 and 7 to 8, wherein the magnetic element (32) uses a small bipolar neodymium iron boron magnet, which is installed on the periphery of the rotating shaft portion (31) of the tonearm (3) and is capable of being linked with the tonearm (3). Then, the sensor (42) is installed on the inner shaft portion (41) of the base (4), wherein a Hall element can be adopted, and the sensor (42) corresponds to the magnetic element (32), and the magnetic field strength of the magnetic element (32) is captured through the sensor (42), and then the data is transmitted back to the control unit (5) [MCU].

Since the magnetic element (32) has closed magnetic field lines, when the tonearm (3) rotates, the magnetic field lines of the magnetic element (32) also change accordingly, so that the relative position of the magnetic element (32) can be determined. When combined with the highly sensitive Hall element, a relatively linear voltage can be generated, and the voltage data is transmitted to the control unit (5) [MCU] for analysis.

Figure 1:
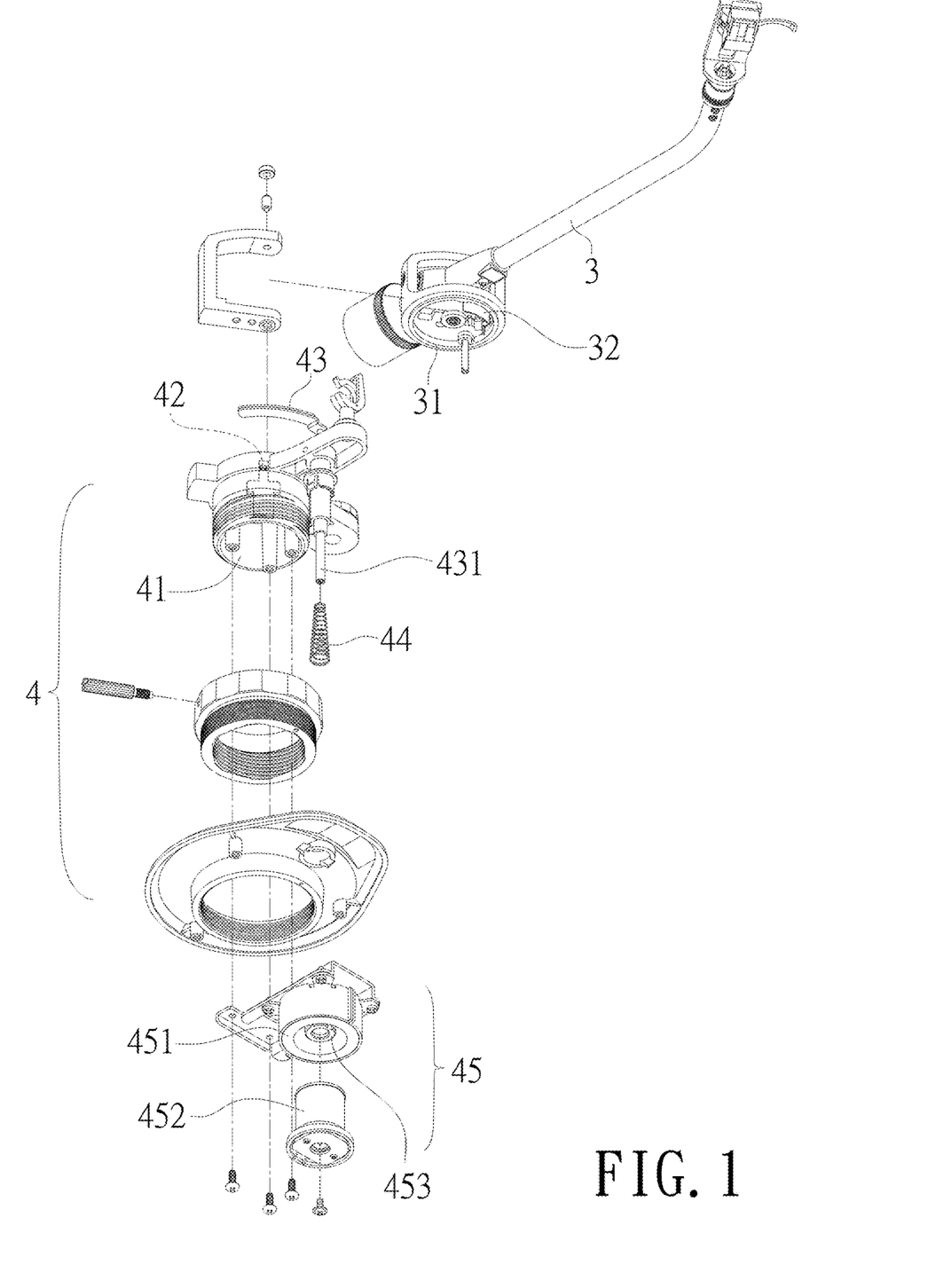
FIG. 1 is an exploded view of the present invention.
Figure 2:
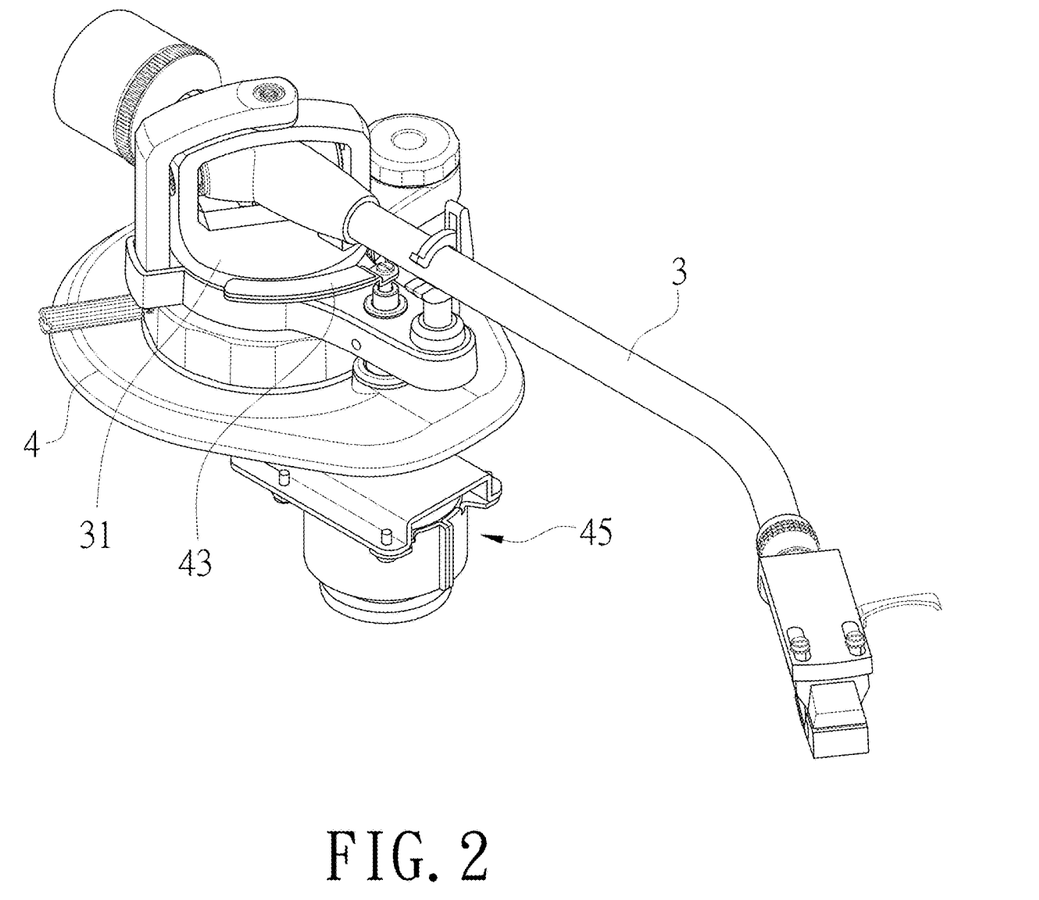
FIG. 2 is a perspective view of the present invention.
Figure 3:
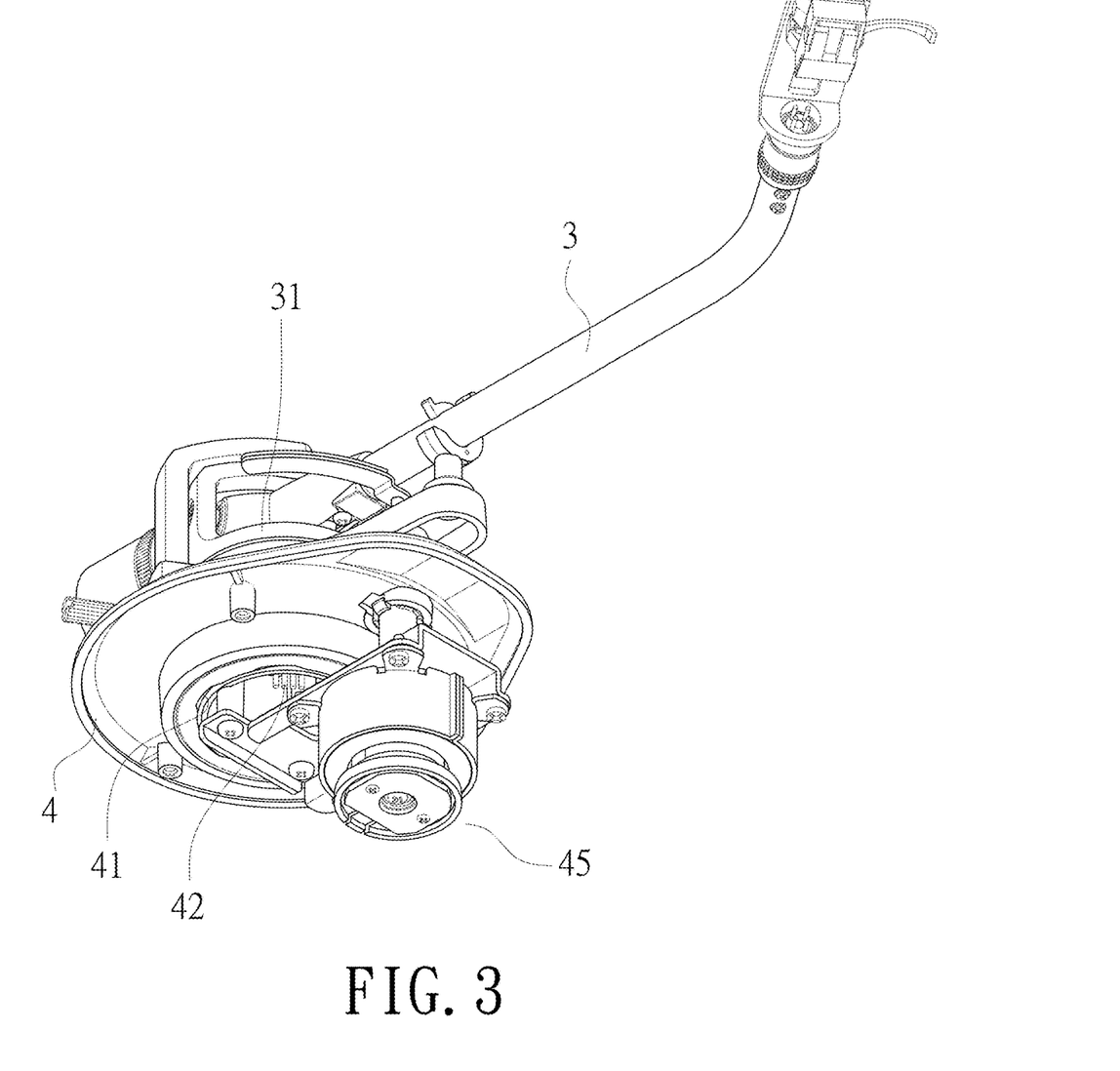
FIG. 3 is a perspective view from another angle of the present invention.
Figure 4:
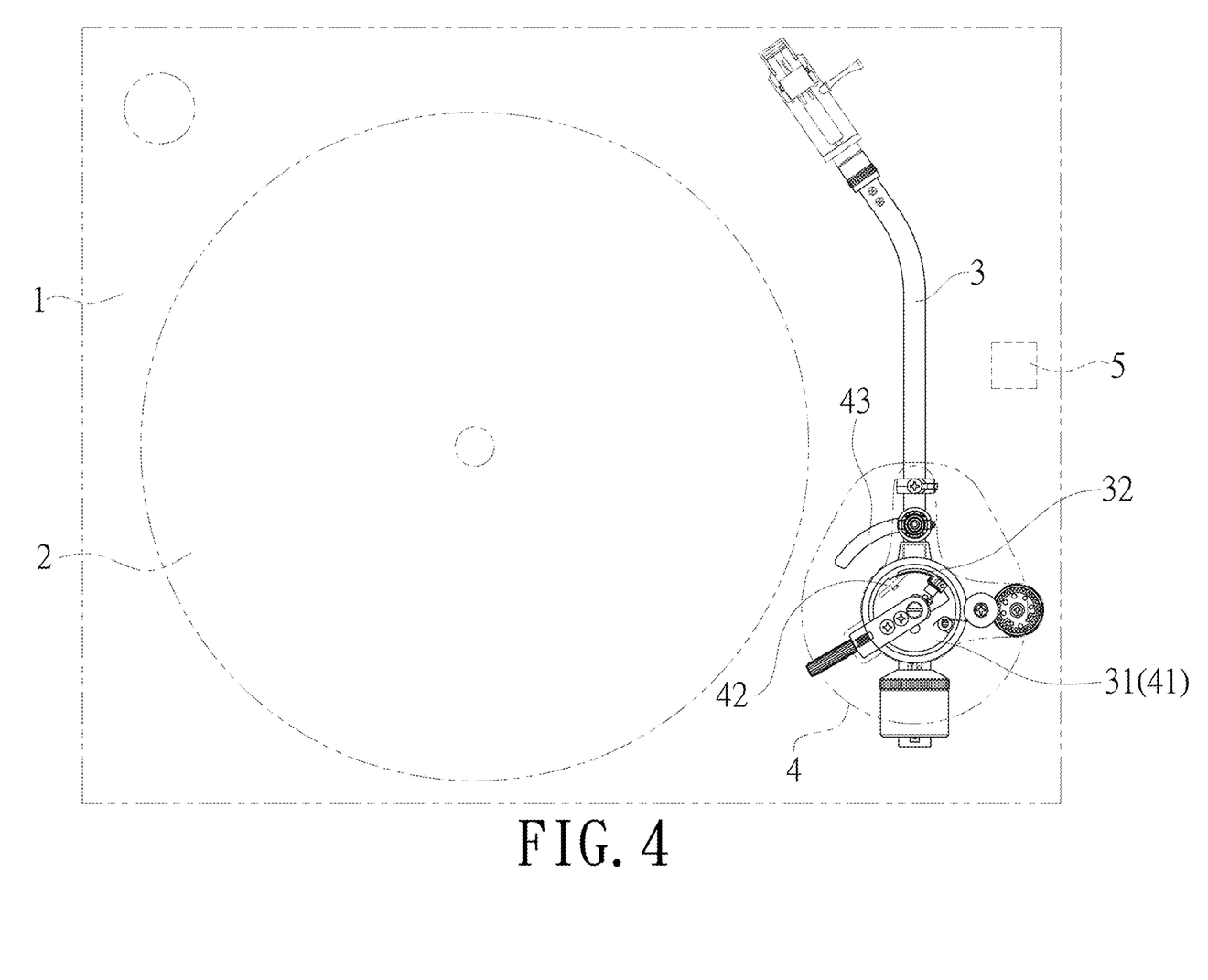
FIG. 4 is an overall top view of the vinyl record player according to the present invention.
Figure 5:
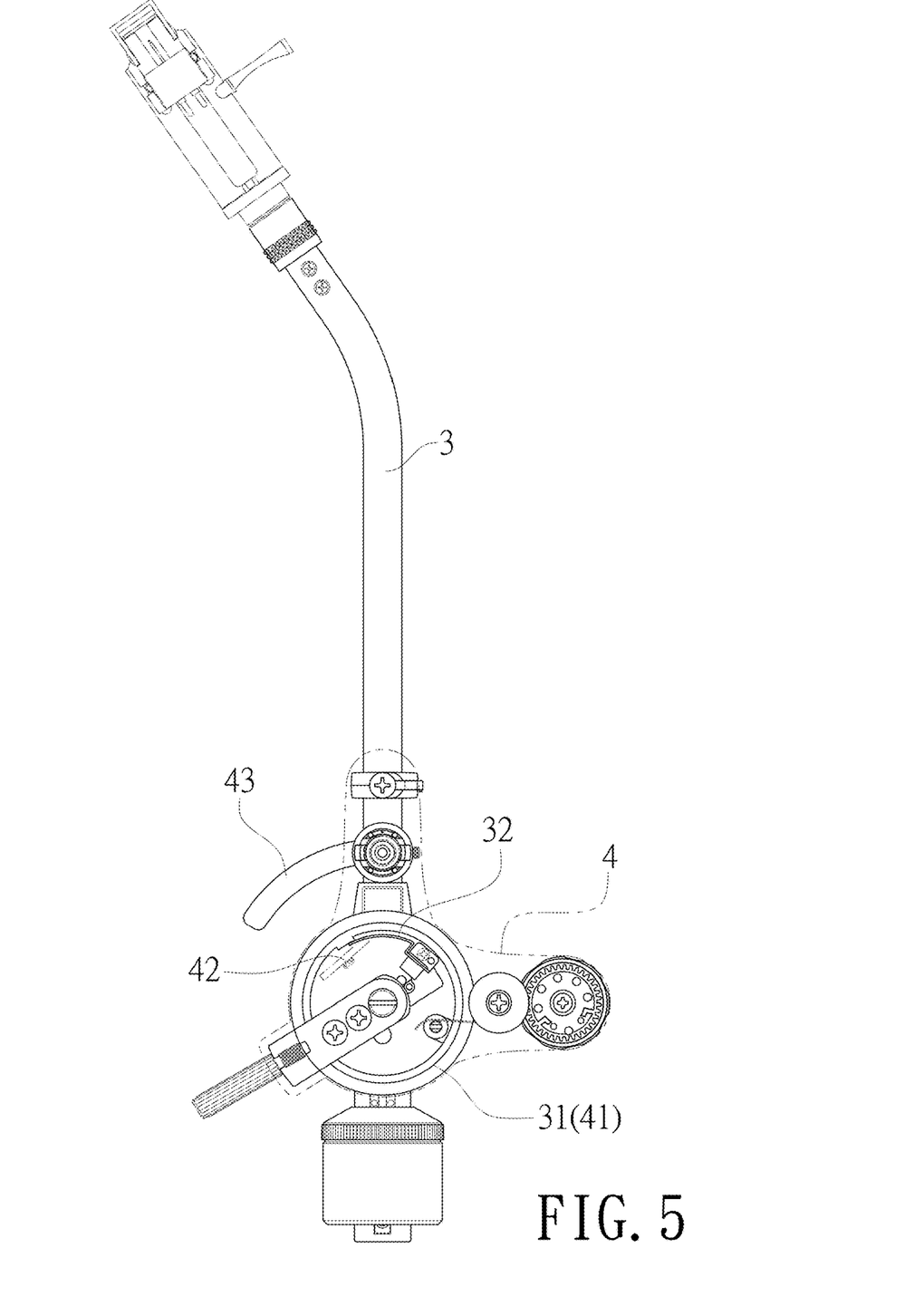
FIG. 5 is a top sectional view of the tonearm of the present invention.
Figure 6:
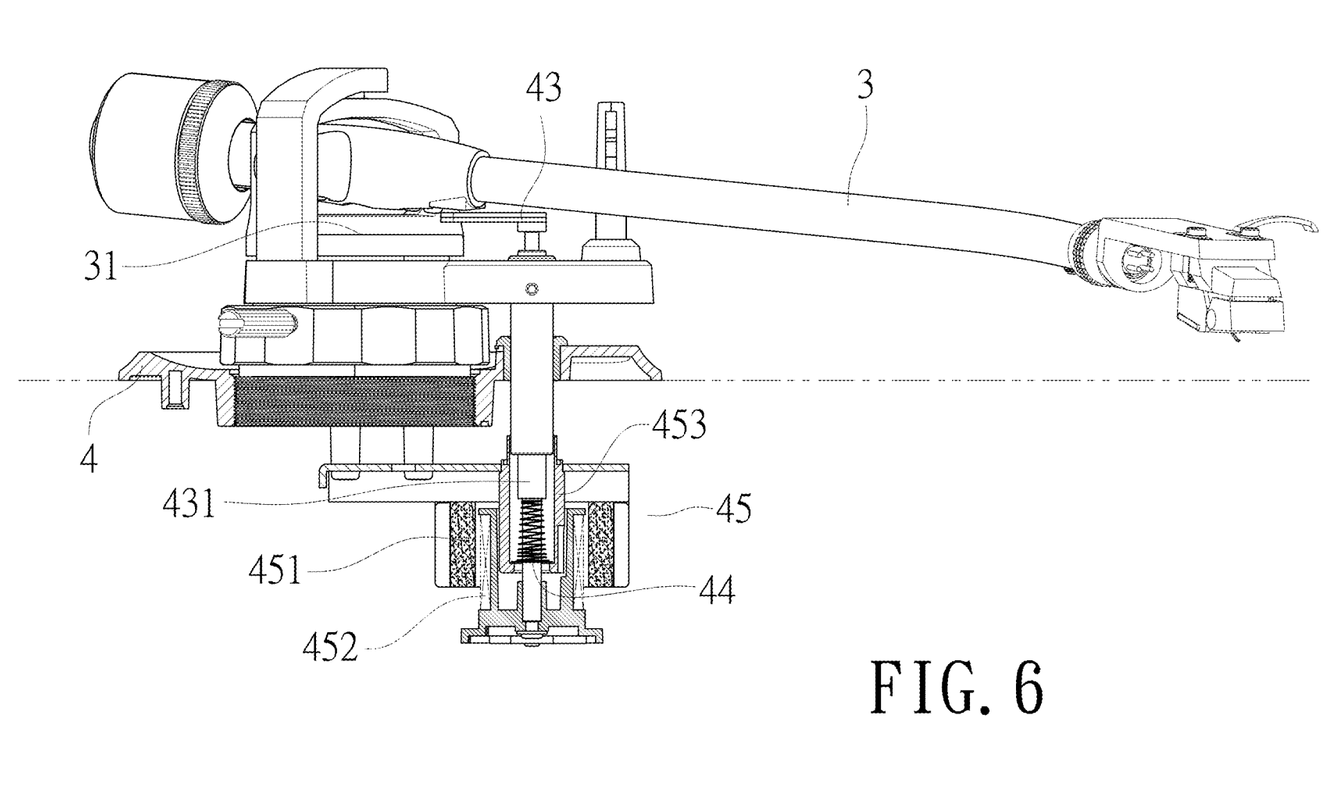
FIG. 6 is a sectional view of the tonearm moving downwards of the present invention.
Figure 9:
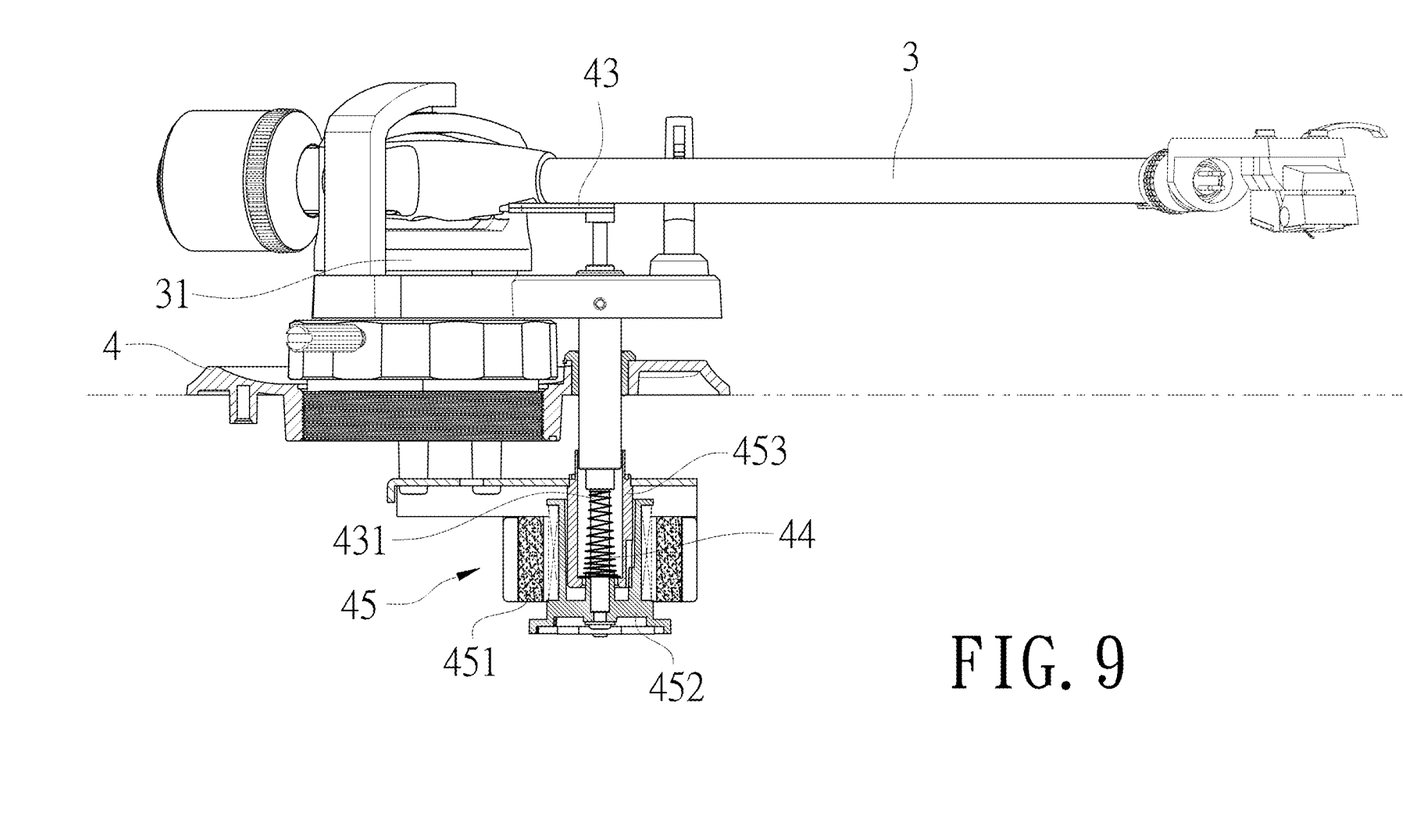
FIG. 9 is a sectional view of the tonearm of the present invention in a resting or lifted state.

(2) Tonearm lifting and lowering part-referring to FIGS. 6 and 9, wherein the electromagnetic unit (45) is assembled at the end of the bracket (43). The electromagnetic unit (45) further includes a radially magnetized magnetic ring (451), a coil (452) embedded in the magnetic ring (451), and a T-shaped high-permeability metal base (453) for mounting the coil (452). After confirming the current direction and magnetic direction of the coil (452), the coil (452) is separated from the magnetic ring (451), which is the correct setting, and then the electromagnetic unit (45) is installed at the end of the central shaft (431) of bracket (43) and the tonearm (3), and the elastic member (44) is positioned.

Before the coil (452) passes current, the elastic member (44) is released to support and lift the bracket (43) and the tone arm (3). When the lower arm button of the vinyl record player is pressed, the power supply system provides current to the coil (452) in the form of pulse width modulation (PWM), and generates a downward pulling force under the staggered magnetic lines of the magnetic ring (451) and the high-permeability metal base (453). The PWM conduction width is increased to obtain a greater downward pulling force to resist the upward pulling force of the elastic member (44), so that the bracket (43) and the tonearm (3) move downwards until the stylus contacts the record and stop increasing the PWM modulation width, and the resultant force with the tensile force of the elastic member (44) is zero, so that the bracket (43) is in a stationary state. When the tonearm (3) rotates into the end point of the record music, the PWM conduction width is reduced to reduce the downward pulling force, so that the bracket (43) can rise due to the tensile force of the elastic member (44) and lift the tonearm (3) until the coil no longer has current to pass through after the PWM is closed.

The actual operation description, referring to FIGS. 4 to 9. When the vinyl record player (1) of the present invention is left standing or the power is turned off, the elastic member (44) [spring] uses its own elastic force to push up and lift the bracket (43) (As shown in FIG. 9), so that the tonearm (3) is placed on the bracket (43), so as to achieve the goal of energy saving and carbon reduction. When music is played, the power is turned on, and the tonearm (3) is moved to the corresponding playback point on the record by the magnetic element (32) and the sensor (42) inside the tonearm (3). Then, the lower arm button of the vinyl record player is pressed, and at this moment, the electromagnetic unit (45) (coil) on the central shaft (431) of the bracket (43) exerts a downward force through current and magnetic force, which is greater than the upward force of the elastic member (44) (compressing the elastic member), causing the bracket (43) to move downward (as shown in FIG. 6), until the stylus of the tonearm (3) contacts the record, allowing the upward and downward forces on the bracket (43) to balance and reduce unnecessary power consumption.

Figure 7:
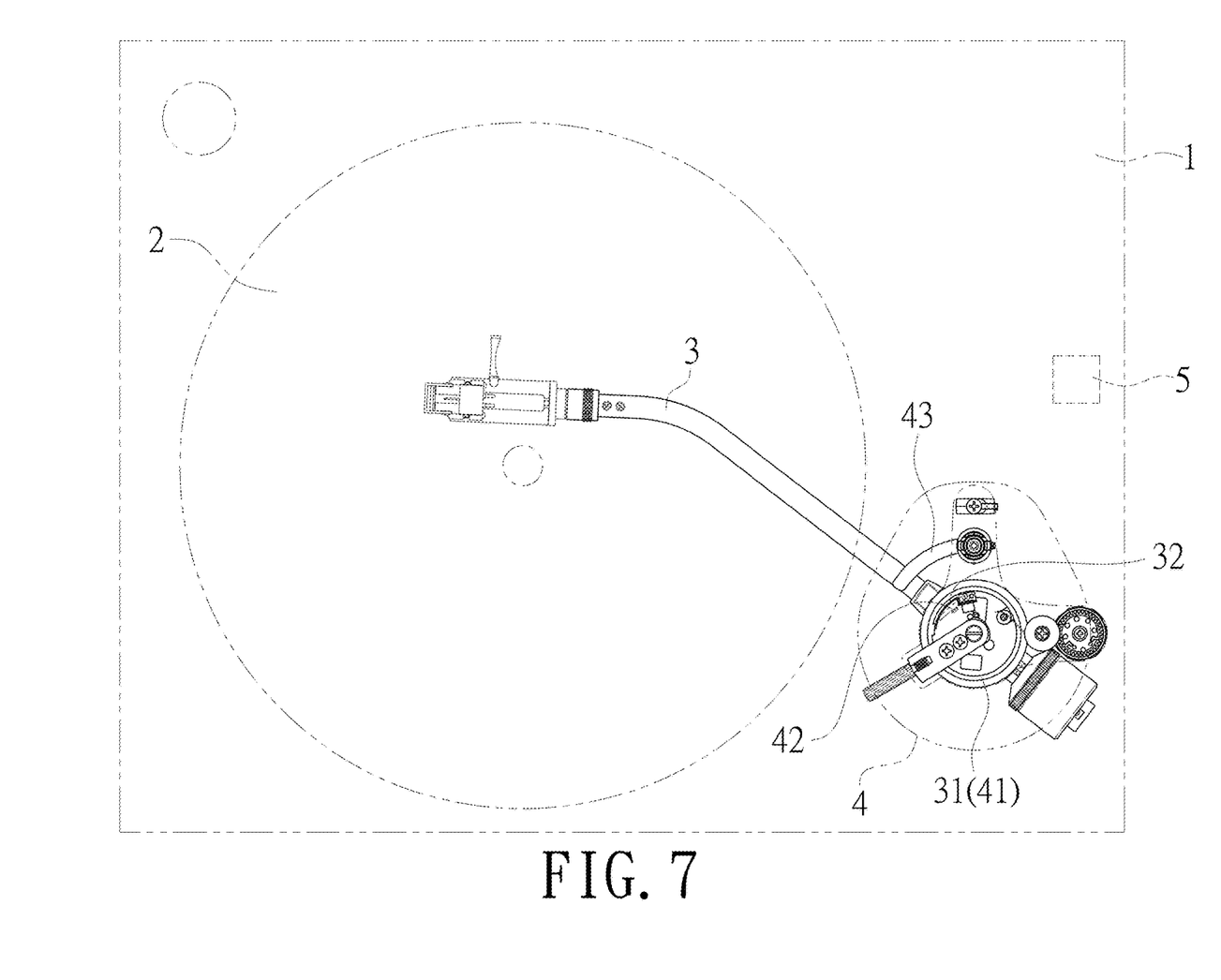
FIG. 7 is a top view of the tonearm rotation angle of the vinyl record player according to the present invention.
Figure 8:
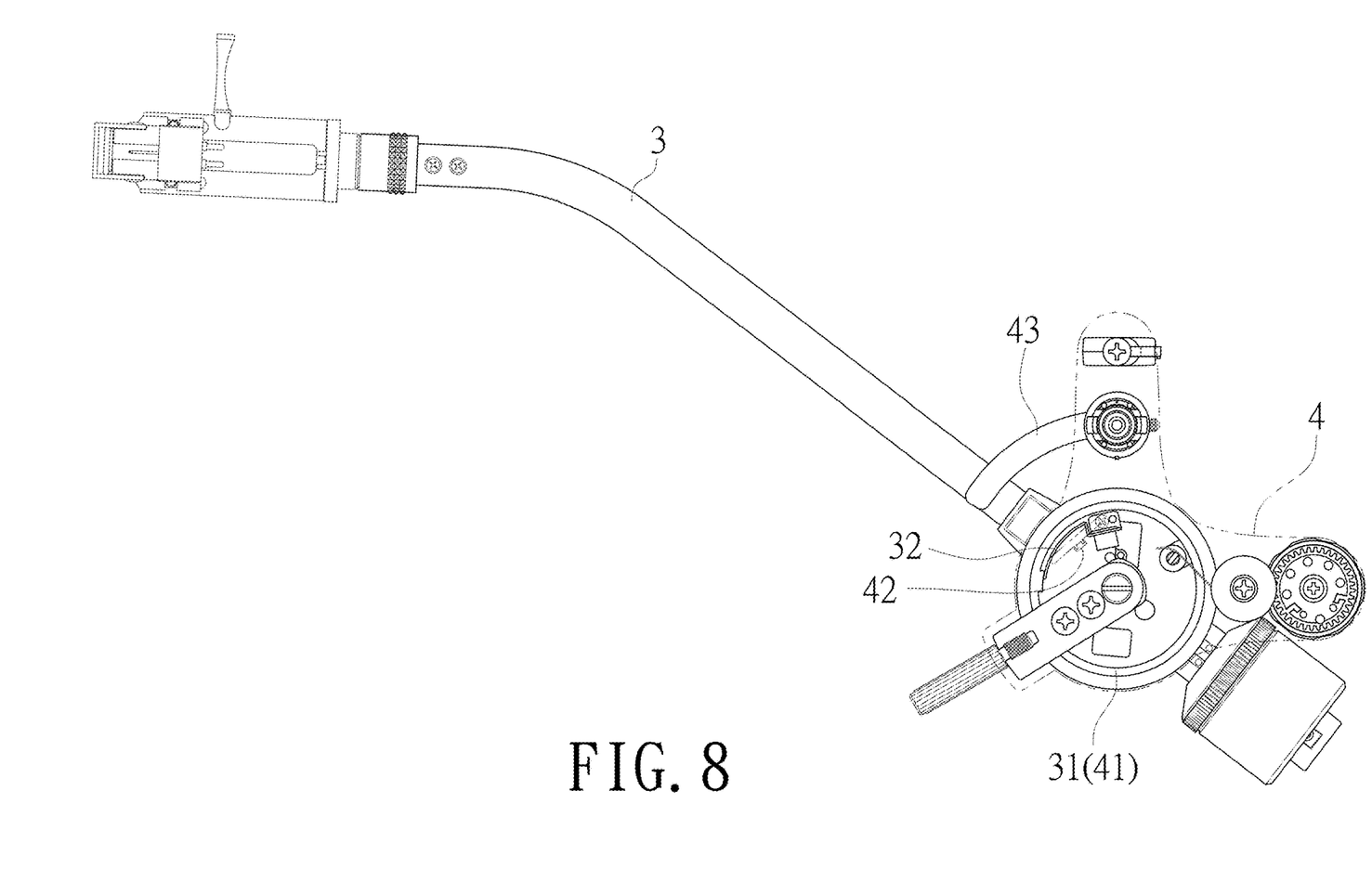
FIG. 8 is a top sectional view of the tonearm rotation angle of the present invention.

When the music reaches the ending stage, the sensor (42) detects the position of the tonearm (3) and if it has reached the end of the music (as shown in FIGS. 7 and 8), the control unit (5) controls the turntable (2) is about to stop. The current of the coil (452) on the bracket (43) gradually decreases, causing the upward force of the elastic member (44) to be greater than the downward force of the coil (452), until no current is applied to the coil (452), so that the bracket (43) rises and lifts the tonearm (3) back to a resting state (as shown in FIG. 9).

The present invention has the following advantages:

1. The automatic stop and lift arm structure of the vinyl record player of the present invention has more precise detection of the stop position of the turntable, which can avoid false stop actions caused by external interference or dust on the record. The movement of the lifting arm adopts programmable controllers to control the coil current, so that the lifting movement of the tonearm is smoother, allowing the stylus to contact the record at an extremely slow speed, thereby extending the service life of the stylus and the record.

2. The automatic stop and lift arm structure of the vinyl record player of the present invention has pre-set music end points according to popular records such as rotation speeds of 33⅓ rpm (record diameter 305 mm), 45 rpm (record diameter 178 mm) and 78 rpm (record diameter 254 mm). Users can rest assured to listen to all music details, and can also customize the starting point of music playback and the automatic stop position of the turntable according to their own preferences. The vinyl record player does not need to be returned to the original factory for adjustment, allowing players to have the fun of self-adjustment.

What is claimed is:

1. A vinyl record player automatic stop and lift tonearm structure, wherein the vinyl record player comprises a base arranged thereon and a tonearm arranged on the base, wherein the base comprises an inner shaft portion arranged thereon, wherein the tonearm comprises a rotating shaft portion correspondingly assembled on the inner shaft portion, so that the tonearm is capable of rotating at an angle relative to the base, wherein the tonearm comprises a magnetic element arranged on the rotating shaft portion that extends along a circumference of the rotating shaft portion, wherein the base comprises a sensor provided on the inner shaft portion corresponding with the magnetic element, wherein the sensor is connected with a control unit, wherein the base comprises a bracket assembled thereon, wherein the bracket has a central shaft arranged thereon, wherein the base comprises an elastic member sleeved on the central shaft and an electromagnetic unit provided on the central shaft to control the lifting and lowering of the bracket, wherein the electromagnetic unit is connected with the control unit.

2. The vinyl record player automatic stop and lift tonearm structure as claimed in claim 1, wherein the sensor adopts Hall element.

3. The vinyl record player automatic stop and lift tonearm structure as claimed in claim 1, wherein the electromagnetic unit comprises a radially magnetized magnetic ring, a coil embedded in the magnetic ring, and a high-permeability metal base for mounting the coil.

4. The vinyl record player automatic stop and lift tonearm structure as claimed in claim 1, wherein the elastic member is implemented as a spring.

5. The vinyl record player automatic stop and lift tonearm structure as claimed in claim 2, wherein the magnetic element is implemented as a bipolar neodymium iron boron magnet.

6. The vinyl record player automatic stop and lift tonearm structure as claimed in claim 5, wherein the electromagnetic unit comprises a radially magnetized magnetic ring, a coil embedded in the magnetic ring, and a high-permeability metal base for mounting the coil.

7. The vinyl record player automatic stop and lift tonearm structure as claimed in claim 6, wherein the elastic member is implemented as a spring.

* * * * *